No. 855,854. PATENTED JUNE 4, 1907.
T. B. JANSSEN.
LOCKING APPARATUS TO PREVENT THEFT AND UNAUTHORIZED
USE OF BICYCLES AND THE LIKE.
APPLICATION FILED APR. 9, 1906.
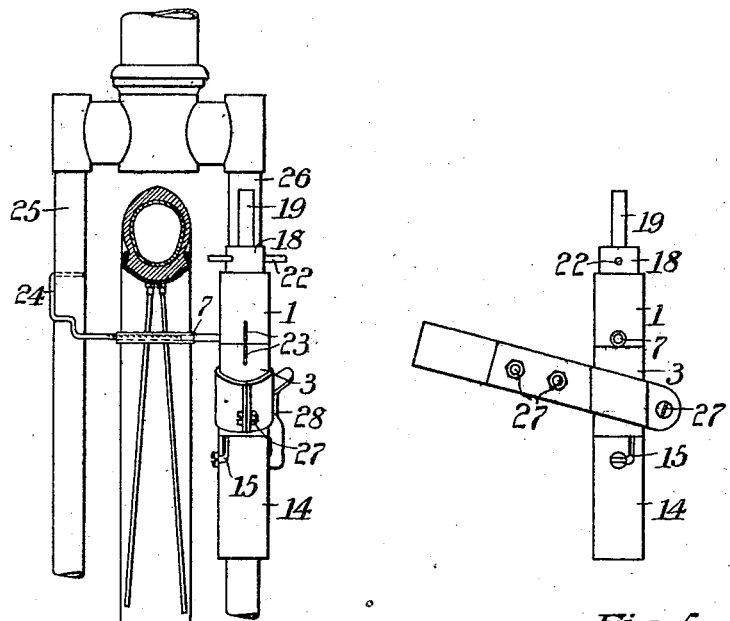
Fig. 4.
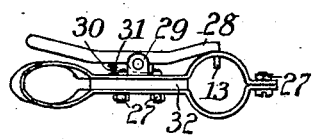
Fig. 5.
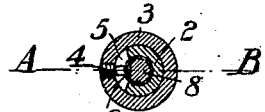
Fig. 6.
Fig. 2.
Fig. 3.
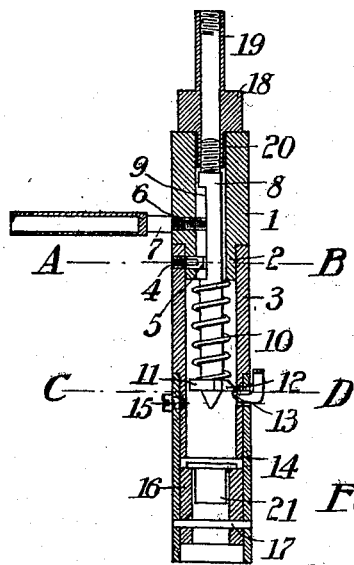
Fig. 1.
Witnesses
Siefke Wilken Janssen
Hermann Schlecht
Inventor
Theodor Bernhard Janssen.
THE NORRIS PETERS CO., WASHINGTON, D. C.

UNITED STATES PATENT OFFICE.

THEODOR BERNHARD JANSSEN, OF HANOVER, GERMANY.

LOCKING APPARATUS TO PREVENT THEFT AND UNAUTHORIZED USE OF BICYCLES AND THE LIKE.

No. 855,854.          Specification of Letters Patent.          Patented June 4, 1907.

Application filed April 9, 1906. Serial No. 310,834.

*To all whom it may concern:*

Be it known that I, THEODOR BERNHARD JANSSEN, a subject of the King of Prussia, and a resident of No. 4 Fundstrasse, Hanover, in the Empire of Germany, have invented a new and useful Improved Locking Apparatus to Prevent Theft and Unauthorized Use of Bicycles and the Like, of which the following is a specification.

The present invention relates to an improved locking apparatus to prevent theft and unauthorized use of bicycles and other vehicles or of revoluble bodies generally.

I will now proceed to describe my invention more fully, reference being had to the accompanying drawings, in which, by way of example, I have shown a bicycle locking apparatus in Figure 1 in a longitudinal section ready for use, Fig. 2 is a transverse section on lines A—B of Fig. 1, Fig. 3 is a transverse section on lines C—D of Fig. 1, Fig. 4 shows the locking apparatus applied to the front fork of a bicycle, Fig. 5 is a side elevation of the locking apparatus according to Fig. 4 and Fig. 6 illustrates, in a plan view, the means of attaching the locking apparatus to the bicycle.

The casing of the locking apparatus consists of the two tubes 1 and 3, of which the head tube 1 is inserted with its lower recessed end 2 into the tube 3. A screw 4 enters through the tube 3 into a transverse slot 5 in the lower portion of the head tube 1 and binds the two tubes 1 and 3 together, allowing same to be rotated the distance of the transverse slot 5. The head of the screw 4 is filed off after the internal end of the screw engages the slot to prevent the separation of the two parts 1 and 3. The bore of the casing accommodates a firing pin 8, which is rectilinearly guided by the head tube 1. To cause the firing pin 8 to be rotated with the head tube 1 and yet to be free to move axially in said tube, a plane surface 9 of the pin is engaged by the plane end face of a lever or bolt 7, which is inserted through a hole 6 in the head tube 1. Said lever 7 is destined to be passed between the spokes of a wheel and to lock the bicycle against theft and unauthorized use. It is further destined to liberate the firing pin and to fire a detonating cartridge when turned by unauthorized persons. These functions will, however, be described more fully later on.

The firing pin 8 is encircled by a coiled spring 10, which presses with one extremity against the lower face of the head tube 1, with the other extremity against an annular flange 11 on the bolt 8 and which tends to force the firing pin downward. The firing pin is arrested and held in its cocked position by a stud 13 engaging under a tooth 12 of the annular flange 11. As shown in Fig. 5 this flange 11 is cut away adjacent to the tooth 12 in order to permit the pin 8 to shoot past the stud 15 against a detonating cartridge in the lower portion of the casing, when, by means of the bolt 7 hereinbefore referred to, the tube 1 and with same the pin 8 is turned in regard to the tube 3, which latter is held fixed to the frame of the bicycle in a manner to be described later on. Over the lower end of the tube 3 is pushed a tubular member 14 and secured thereto by means of a bayonet joint 15. The stud 15 for supporting the tooth 12 of the firing pin 8 and for holding the latter in its cocked position passes through a hole in this tubular member 14 and in the tube 3. By this arrangement a thief, attempting to remove the tubular member 14 from the member 3 will have to pull back the stud 13 first to open the bayonet joint 15. In thus extracting the stud 13 from the casing the firing pin 8 is liberated and the detonating cartridge fired.

The cartridge carrier 16 is situated inside the tubular member 14 and secured therein by means of a transverse pin 17 which penetrates the bore of the tubular carrier 16 for the purpose of preventing the cartridge to be bored, destroyed or extracted by a cork screw or the like.

The cocking of the firing pin is effected by means of a key 18, whose internally screw-threaded end 19 is inserted from the top into the head portion 1 of the casing and is screwed on the firing pin 8, which shows at its upper end a suitably screw-threaded projection. The key 18 may be provided with lateral arms 22 to facilitate pulling. In pulling the firing pin, the spiral spring 10 is compressed. Care must be taken that during pulling the two members 1 and 3 of the casing assume a predetermined correlative position in order to arrest the firing pin 8 in its cocked position. Marks 23 on the two members 1 and 3 indicate, when situated in alinement, the position in which the stud engages under the tooth 12 of the firing pin 8. Both the stud 13 and the tooth 12 are suitably wedge-shaped as indicated in the drawing.

The key 18 having been employed for cocking the apparatus and the firing pin 8 having being arrested by the stud 13 engaging under the nose 12, the screw arm 19 of the key 18 can be unscrewed and the firing pin can be securely locked by screwing on same the shorter arm 20 of the key 18, the latter abutting on the member 1 when the firing pin is firmly held. It is obvious that during removal of the key the two members 1 and 3 of the casing must not suffer rotation, since in rotating the member 1 the firing pin 8, partaking in the rotation as previously specified, would be liberated from the stud 13 and in consequence the shot would be fired. When the firing pin 8 is held by the arm 20 of the key 18, the bolt 7 and with it the head tube 1 can be freely moved within the limits drawn by the slot 5.

The apparatus is charged, after firing the detonating cartridge, in the following manner. The firing pin 8 is first of all cocked and secured by the arm 20 of the key 18. The stud 13 is then removed from the casing and the tubular member 14 containing the cartridge carrier is taken off, the separation of the member 14 from the member 3 being possible since the removal of the stud 13 no longer obstructs the opening of the bayonet joint 15. On insertion of a new cartridge 21 the parts 14, 13 are returned to their previous position.

The apparatus hereinbefore described is attached to the bicycle by means of a clip secured around one of the members of the front fork as indicated in the drawing. The attempt of taking off the apparatus by removing the clip screws 27, involves the extraction of the stud 13, from the casing, the stud 13 being arranged on the clip as will be described in detail immediately hereafter. By the extraction of the stud 13 the firing pin 8 is set free and the cartridge is exploded, provided the key 18 has been removed from the casing by the owner. The stud 13 is attached at or integral with one extremity of a two-armed lever 28, whose fulcrum or pivot pin is mounted in the bracket 29 firmly secured to the clip. A spring 30 presses against the two-armed lever 28 and tends to force the stud 13 into the casing. A nose 31 of the lever 28 secures the spring 30 in position on the clip.

It has been found to be advisable to strengthen the clip attachment by inserting a filling 32 between the two arms of the clip adjacent to the apparatus, said filling being secured in position by the clip binding screws 27.

A bicycle having a locking apparatus of the kind hereinbefore described attached to its front fork, is safeguarded against theft and unauthorized use by passing the bolt 7 between the spokes of the wheel and subsequently removing the key 18 from the casing. On turning the wheel or the bolt 7 the head tube is rotated in regard to the member 3 and the cartridge is exploded, the firing pin 8 being rotated with the head tube 1, and liberated from the stud 13 which remains stationary with the member 3. The detonation attracts passers-by and the police, so that the arrest of the would-be thief can be effected.

To prevent the detonation of the cartridge by accidental turning of the wheel for instance by children playing about, the locking bolt 7 receives in a bore a hook 24 which engages the second prong 25 of the front fork. The bolt 7 is thus held against movement. Experience has shown that the intelligence of children does, in general, not suffice to understand the functions of the apparatus, but a thief will find ways and means of separating the hook 24 from the bolt 7, which latter by turning fires the shot.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims, or of mechanical equivalents to the structure set forth.

What I do claim as my invention, and desire to secure by Letters Patent, is:

1. Locking apparatus to prevent theft and unauthorized use of bicycles and other vehicles, comprising a cartridge holder, means for automatically firing the cartridge when the vehicle is moved, and means for attaching the cartridge holder to the vehicle, substantially as set forth.

2. Locking apparatus to prevent theft and unauthorized use of bicycles and other vehicles comprising a casing, a firing pin housed and guided in said casing, means for locking the firing pin in its cocked position, means for automatically liberating the firing pin, when the vehicle is moved, a cartridge carrier attached to the aforesaid casing and removable only by extracting the locking means of the firing pin, and means for attaching the casing to the vehicle, substantially as set forth.

3. Locking apparatus to prevent theft and unauthorized use of bicycles and other vehicles comprising a casing, a firing pin housed and guided in said casing, means for locking the firing pin in its cocked position, means for automatically liberating the firing pin, when the vehicle is moved, a cartridge carrier attached to the aforesaid casing and removable only by extracting the locking means of the firing pin and a clip for attaching the casing to the vehicle, said clip carrying the locking means of the firing pin, substantially as set forth.

4. Locking apparatus to prevent theft and unauthorized use of bicycles and other vehicles comprising a casing constructed of two tubular members 1 and 3 connected together so as to be capable of rotary movement only, a firing pin 8 housed and guided in said casing means for locking the firing pin in its cocked position means for causing the firing pin to partake of the rotary movement of the top tubular member 1 of the casing, a bolt 7 attached to the top tubular member 1 adapted to pass between the spokes of the wheel, a cartridge carrier attached to the lower tubular member 3 of the casing and removable only by extracting the locking means of the firing pin, and means for attaching the device to the vehicle, substantially as set forth.

5. In combination with a locking apparatus to prevent theft and unauthorized use of a bicycle and other vehicle of the kind referred to, a locking stud for the firing pin adapted to engage under a tooth of the latter, said locking stud penetrating through a hole in the shell of the cartridge carrier into the casing to prevent the cartridge carrier from being detached without previously liberating the firing pin, substantially as set forth.

6. In combination with a locking apparatus to prevent theft and unauthorized use of a bicycle and other vehicle of the kind referred to, a clip for attachment of the device to the vehicle, a two armed lever pivoted on said clip, a locking stud for the firing pin at one extremity of the aforesaid lever, said locking stud penetrating through a hole in the shell of the cartridge carrier into the casing to prevent the cartridge carrier from being detached without previously liberating the firing pin, and a spring acting on the two armed lever and forcing the locking stud into the casing, substantially as set forth.

7. In combination with a locking apparatus to prevent theft and unauthorized use of a bicycle and other vehicle of the kind referred to, a cartridge carrier opening outward in such a manner, that the insertion of a cork screw for the removal or destruction of the detonating cartridge is rendered impossible, substantially as described.

8. In combination with a locking apparatus to prevent theft and unauthorized use of a bicycle and other vehicle of the kind referred to, a hook to be attached to the bolt 7 after the latter has been passed between the spokes of the wheel, said hook adapted to engage a stationary member of the vehicle frame, substantially as described and for the purpose set forth.

In witness whereof I have hereunto signed my name this 26 day of March 1906, in the presence of two subscribing witnesses.

THEODOR BERNHARD JANSSEN.

Witnesses:
HERMANN MYER,
H. SCHLEEF.